United States Patent [19]

Ikeda et al.

[11] 3,848,086

[45] Nov. 12, 1974

[54] PICTURE INFORMATION DISPLAY DEVICE

[75] Inventors: Hiroki Ikeda; Teruo Hirashima; Tetsuo Sakal: Soichi Iwamura; Iwao Ohishi; Takashi Fujio; Takeo Kamegaya, all of Tokyo, Japan

[73] Assignee: Nippon Hoso Kyokai, Tokyo, Japan

[22] Filed: Sept. 12, 1972

[21] Appl. No.: 288,435

[30] Foreign Application Priority Data

July 17, 1971 Japan .............................. 46-71729

[52] U.S. Cl...... 178/7.3 D, 315/169 TV, 340/324 M

[51] Int. Cl. .......................................... H04n 5/66

[58] Field of Search ........... 178/7.3 D; 315/169 TV, 315/169 R; 340/166 EL, 324 M; 313/108 B; 250/220 M

[56] References Cited

UNITED STATES PATENTS

| | | | |
|---|---|---|---|
| 3,021,387 | 2/1962 | Rajchman | 178/7.3 D |
| 3,564,135 | 2/1971 | Weimer | 178/7.3 D |
| 3,590,156 | 6/1971 | Easton | 315/169 TV |
| 3,683,364 | 1/1971 | Holz | 315/169 TV |
| 3,696,393 | 10/1972 | McDonald | 340/166 EL |
| 3,702,985 | 11/1972 | Proebsting | 340/166 EL |

*Primary Examiner*—Robert L. Richardson
*Attorney, Agent, or Firm*—Stevens, Davis, Miller & Mosher

[57] ABSTRACT

A picture information display comprising a combination of a gas-discharge display, having separate display and scanning functions, and an MOS series-parallel converter, in which MOS analog gates, for all of the bits in an MOS shift-register, and associated analog memory capacitors are provided, for television picture-information signals to realize a flat-panel TV receiver.

3 Claims, 10 Drawing Figures

PICTURE INFORMATION DISPLAY DEVICE

BACKGROUND OF THE INVENTION

1. Field of the Invention

The present invention relates to a picture information display device and more particularly to a flat plane type display device for a picture information signal such as a television signal.

2. Description of the Prior Art

A picture information display device comprising a matrix arrangement of photocells at corresponding locations of the picture elements comprising a picture has become of great interest recently. There have been a number of research works for flat plane type display devices having such matrix arrangement of luminance elements. For instance, it has been disclosed as a trial of a flat plane panel television equipment (Ibuki et al. "EL Panel Television", Mitsubishi Denki Giho, 1970, 44.11, pp. 1534–1539; T. J. de Boer, "An experimental 4,000 picture element gas discharge TV display panel", 9th national symposium on Society of Information Display, May 1968).

In the disclosed devices, the picture information is supplied to respective picture elements in a horizontal axis via a temporary memory, and the vertical axis is so designed that the scanning proceeds to the next line after each picture element of the horizontal axis is addressed for a period at least equal to one horizontal scanning period. Furthermore, in the known display devices, each picture element produces luminance for part of the time during the addressed period and by varying said luminant time, the luminance of the picture element is controlled. However, such systems which may be regarded as being based on a principle of pulse width modulation, are not suitable for practice from their basic principle. Namely, in these devices the scanning function and the luminance controlling function are not separately provided and are formed based on a principle that a cross point of horizontal and a vertical scanning addresses may produce light. Therefore in view of obtaining a definite address only the pulse width modulation can be used. Thus such a system is not suitable for use with intermediate tone modulation which may be termed analog modulation. In case the contrast range of the luminance element is desired to be widened by the pulse width modulation, it is necessary to obtain a stable light even at minimum necessary brightness by sufficiently shortening the time for starting and diminishing each luminance element. However, due to unavoidable transient characteristics of an available luminance element, the above mentioned character is very difficult to realize in practice. Namely, it can be said that it is nearly impossible to indicate a wide band intermediate tone display by the principle known heretofore.

Furthermore, in the known devices, the peripheral circuits such as an addressing or driving circuit, pulse width converting circuit, etc. become comparatively complicated. These circuits are usually made of bipolar transistors and possibly some small scale digital integrated circuit elements and hence are not suitable for obtaining high accuracy display and mounting with high density.

When a television display device is desired to be formed in a flat plane shape with high luminance and high resolution, line at a time scanning is required. However, in the display of line at a time scanning the group of driving circuits, should be provided in a number equivalent to the number of picture elements per each scanning line. Therefore conventional transistors or small unit integrated circuit devices are not suitable for use as the unit of such device. More particularly, if the sample and hold circuit for sampling the picture information and dividing it into picture elements and holding them at least for one line period should be formed by an electronic circuit, only the large size integrated device (LSI) can fulfil the necessary requirements for practically realizing such devices.

SUMMARY OF THE INVENTION

The present invention has for its object to realize a picture information display device having high brightness, high fidelity, and intermediate tone reproducing functions and is suitable for mass-production by means of an integrated circuit element in view of the aforementioned problems.

In order to realize the above object, the device according to the present invention comprises a gas discharge display device having the display function and the scanning function separately. The device further comprises a means for sampling and holding the picture information signal corresponding to picture elements of the display device and which is made of memory elements and active elements suitably made from integrated elements and disposed at the display side of the display device. Further the device comprises a luminance controlling means for controlling gas discharge current of said display device according to the picture information signal of said sampled signal and which is connected at the display side of the display device.

In practice, according to an embodiment of the present invention, for instance, a self-scanned panel display (hereinafter may be abbreviated as SSPD) of Burroughs Inc. is used in combination with a large size integrated (LSI) metal oxidized semiconductor (MOS) capacitor memory for effecting continuous line scanning and analog modulation. The device is able to display a standard television picture. In the device according to the invention, the scanning function and the display function which may be termed as "luminance modulation" or "control function" are made independently, therefore, a very stable and definite display is possible. Furthermore, the sample and hold circuit may be made very simple with high quality and by with a very compact circuit element so that such circuit can be accommodated for high density, high brightness and high fidelity. Also wide range intermediate tone display can be obtained and a mass-production by using integrated devices is possible.

DESCRIPTION OF THE PREFERRED EMBODIMENT

Figure 1:
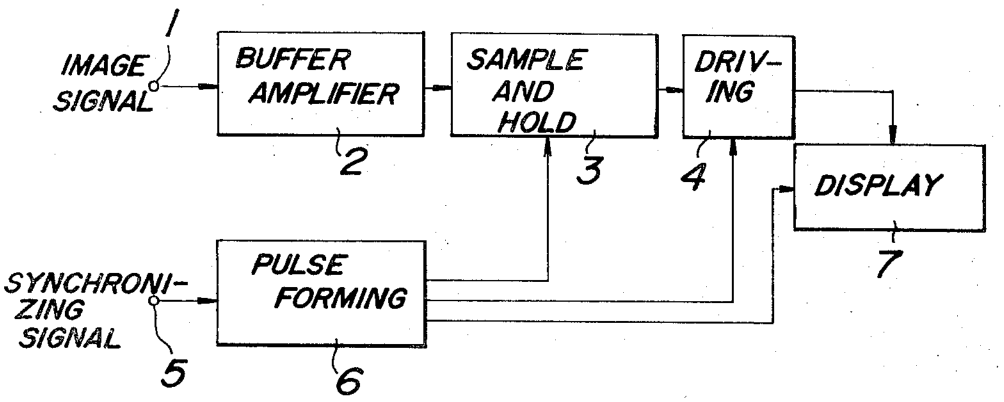
FIG. 1 is a block diagram showing one embodiment of the picture information display device according to the present invention.

In order to give a clear understanding of the present invention, one embodiment of the picture information display device will be explained, of which a block diagram is shown in FIG. 1.

As mentioned in the foregoing, according to the present invention the scanning function and the display function are provided independently of each other so that both functions can be effected definitely by using a Burroughs type self-scanned panel display device (SSPD). The standard type television picture may be displayed with high brightness by continuous and succeeding scanning in the horizontal direction by combining the MOS capacitor memory and by applying analog modulation which will be explained in more detail hereinafter.

In FIG. 1, 1 is an input terminal of a luminance signal and an ordinary television image signal may be supplied thereto. 2 is an image buffer amplifier provided to obtain a high level signal of about 10 $V_{P\text{-}P}$VS (peak to peak voltage) with low input impedance with respect to an ordinary transmission level. The buffer amplifier 2 supplies the image signal supplied at the terminal 1 to a sample and hold circuit 3. The sample and hold circuit 3 samples the applied image signal with sampling pulses at a rate of several hundreds to tens nano seconds (ns) and holds the sampled image signal. Namely, this sample and hold circuit 3 holds every picture element of an image signal separately. 4 is a driving circuit for a display device 7 and for making brightness modulation by the signal constituting each picture element. 5 is a synchronizing signal input terminal for supplying the synchronizing pulse group to said display device 7 and to said sample and hold circuit 3. 6 is a circuit for producing said group of pulses from the synchronizing signal according to the respective object. The display device 7 is a Burroughs type SSPD which has a scanning function controlled by pulses supplied to the scanning anodes and the cathodes. The display function is realized by changing the value of current to be supplied to the display anodes which are the electrodes for controlling the respective picture element.

The operation of the present device is indicated in the time charts of FIGS. **2*b*–2*g*. In accordance with the embodiment, a horizontal scanning period, which may be abbreviated as 1H having a duration of about 63.5 $\mu s$, is divided into several hundred picture elements by using the sampling circuit in the memory circuit 3. Thus a sampled picture element signal is stored in the analog memory circuit in the holding circuit 3. Thus the stored picture element signal is supplied to the displaying anodes of the display device 7 through the driving circuit 4** for a period corresponding to one horizontal scanning line (at least equal to 1H). In this case, if an analog memory is used, each picture signal can be displayed linearly.

FIG. **2*a* indicates the relative location of the display anode and the cathode of the display device 7.** The scanning is effected by scanning the cathode 1, 2, 3, ... *i*, ... *n* by 3 phase clock pulses $\phi_1$, $\phi_2$, $\phi_3$ in the sequence and in the period of 1H or an integral multiple thereof. In FIG. **2*c***, the wave form of 3 phase clock pulses $\phi_1$, $\phi_2$, $\phi_3$ in the case of the 1H scanning period is shown.

Figure 2A:
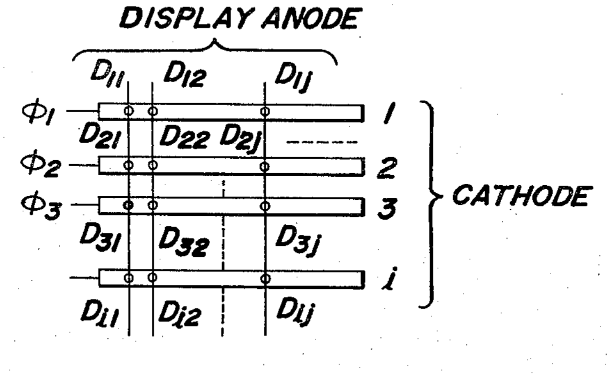
FIG. 2*a* is a schematic view showing the display anode and cathode of the display device.
Figure 2B:
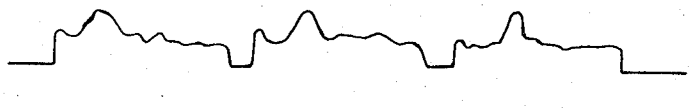
FIGS. 2*b*–2*g* are time charts used for explaining the operation of the device according to the present invention.
Figure 2C:
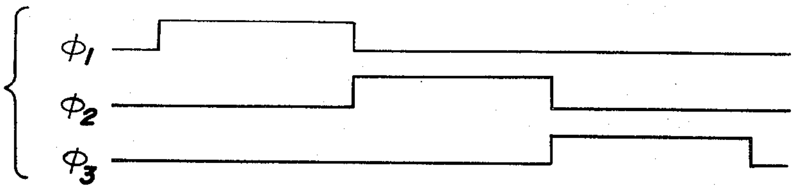
Figure 2D:
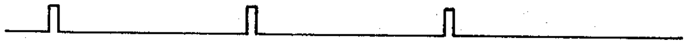
Figure 2E:
Figure 2F:
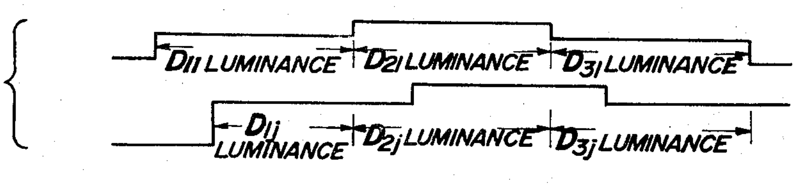

FIG. **2*b* shows the wave form of an image signal, FIG. 2*d* shows the first sampling signal and FIG. 2*e*** shows the *j*th sampling signal. FIG. **2*f* shows the sampled analog signal sampled by these sampling signals. These analog signals are sequentially supplied to photocells $D_{1i}$, $D_{1j}$, $D_{2i}$, $D_{2j}$, $D_{3i}$, $D_{3j}$ in synchronism with the scanning. By said driving control, each photocell $D_{1i}$, $D_{1j}$, $D_{2i}$, $D_{2j}$, $D_{3i}$, $D_{3j}$ luminances according to the supplied analog signal in the time relation as shown in FIG. 2*f*.**

Figure 2G:
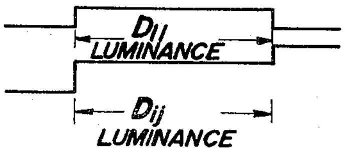

As mentioned in the foregoing and as may become clear from FIG. **2*f* a distortion of the display picture in the vertical direction is produced if the luminance excitation is effected by the directly sampled analog signal. Therefore said sampled analog signal may temporarily be memorized and simultaneously read out for each one line, and photo conversion is effected for every line. FIG. 2*g* shows a relation of luminance time of each photocell excited in such storing manner. In this case two systems of sample and hold circuits are required of which one example is shown in FIG. 3.** Said two systems are alternatively used by switching.

One feature of the device according to the present invention is the separation of the scanning function and the function of the luminance modulation. This is realized by the fact that the scanning is effected between a scanning anode (not shown) and the cathode and by effecting the luminance modulation between the display anode and the cathode. According to one aspect of the present invention, the Burroughs type SSPD having said separate functions is taken into consideration and by introducing a series of operations such as sampling of the image signal, memorizing, driving and displaying, a novel picture image display can be carried out.

Figure 3:
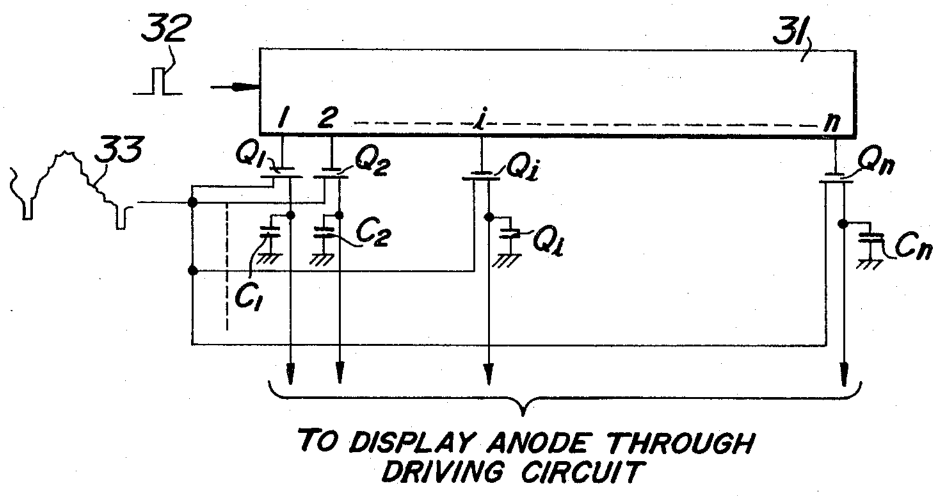
FIG. 3 is a circuit diagram of one example of the sample and hold circuit.

Sampling and holding of the image signal is effected in a circuit shown in FIG. 3. In FIG. 3, 31 shows *n* bit shift register comprising MOS dynamic logics. $Q_1$, $Q_2$, ... $Q_i$, ... $Q_n$ are gate transistors for sampling and each of which is made of an MOS transistor. In practice said MOS transistors are formed by integrated elements so that an off-set voltage usually accompanied to a sample gate of a signal does not exist from the principle and a stabilized gating can be made up to a high frequency. $C_1$, $C_2$, ... $C_i$, ... $C_n$ are memory condensers. Usually, these condensers are made by an integrated element and conveniently made from tantalum ($Ta_2O_5$ - Ta). 32 is a synchronizing gate pulse and used as a trigger signal for driving said *n* bit shift register 31. According to said triggering signals output pulses appear at output 1, 2, ... *i*, ... *n* sequentially. 33 shows a general form of an image signal. The gate transistors $Q_1$, $Q_2$, ... $Q_i$, ... $Q_n$ are sequentially switched on according to said pulses sequentially appearing at the shift register outputs 1, 2, ... *i*, ... *n* and by these output signals the image signal 33 is sequentially sampled and stored temporarily into memory condensers $C_1$, $C_2$, ... $C_i$, ... $C_n$. The number of memory condensers $C_1$, $C_2$, ... $C_i$, ... $C_n$ are the same number of as the number of the picture elements. The stored charges in these condensers $C_1$, $C_2$, ... $C_i$, ... $C_n$ are used for modulating the discharge cell of the display device through the driving circuit. The charges thus stored in the condensers can be read out by a high impedance input circuit, for instance, an emitter follower circuit or a source grounded circuit having a MOST gate as the input circuit or a source follower arrangement. Accordingly, although the circuit is constructed as a volatile reading type but, it has nearly the same function with a device constructed as a non-volatile reading function. Renewal of data to the temporary memories is made with the gate sampling pulse obtained from the next synchronizing pulse which occurs at least after a 1H period and is synchronized with the horizontal synchronizing pulse.

Figure 4:
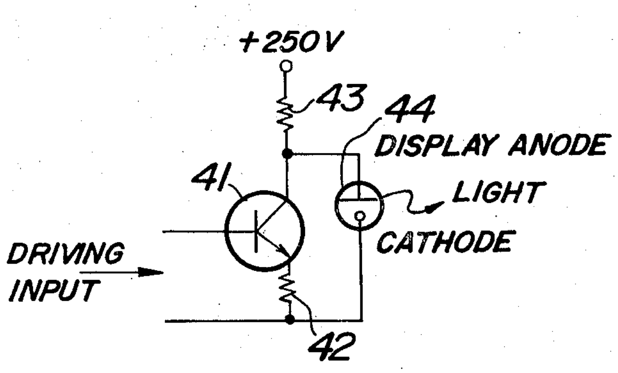
FIG. 4 is one embodiment of the modulation and driving circuit.

The display of the signal read out from the condenser is controlled by a modulation driving circuit as shown in FIG. 4. In FIG. 4, 41 is a driving transistor, 42 is a resistor inserted for obtaining linearity of the modulation, 43 is an output load resistor and 44 is a pair of display anode and cathode of one photocell of the display device.

In this modulation driving display circuit a constant voltage is maintained between the display anode and the cathode for a period when the display device is luminating. For instance, in a display panel made by Burroughs, said voltage is about 160 V. Accordingly, the current flowing through the load resistance 43 is approximately constant always and is for instance:

$$[250 - 165\ (V)]/[R\ (k\Omega)]\ mA$$

Therefore the modulation may be effected by dividing said constant current into a current flowing through the transistor 41 and one through the display cell 44. In this case a linearity compensating resistor 42 is inserted in the emitter circuit of the transistor 41, a current proportional to the modulating input voltage flows through the transistor 41 and a modulation character of $\gamma = 1$ can be obtained. An essential feature of this driving modulation circuit is that the luminance modulation is effected by linearly varying the distribution of a current flowing through the transistor in analog operation and a current flowing through the photocell.

In the embodiment mentioned above the driving transistor 41 and the luminating photocell 44 are connected in parallel but it is obvious that these two elements may be connected in series and formed as a series modulation element. It is preferred to form the driving transistor 41 as a MOS transistor to be able to form a MOSIC.

The picture information display device according to the present invention comprises its hardware construction as substantially mentioned above and therefore comprises its main merits described below.

1. As it is formed by a Burroughs type SSPD having separate display function and scanning function, an analog picture element display luminance modulation, which in the conventional system was impossible, can be effected in an easy and definite manner.
2. As the device employs a MOS linear memory system based on MOS-LSI, it is very easy to make line sequential scanning by temporarily memorizing horizontal picture elements even up to a number of 2,000. Therefore, the system construction can be made very simple when displaying a standard and Hi-Fi television picture.
3. It is possible to form the device by a large scale integrated circuit (LSI) accommodating an image buffer amplifier, a sample and hold circuit, and a driving buffer. Therefore an economical and high quality display device can be manufactured in a mass-productive manner. In the near future a Hi-Fi television receiver using the method of the present invention may practically be manufactured.

The color display system using this principle may slightly become complicated but even in this case by using the system of the present invention a light and compact display device may be realized. A display device of a television signal can be applied not only for the standard television system or for receivers of Hi-Fi television but can be used for a picture monitoring and stop picture display device.

Various modifications in actual application of the present invention may be possible without departing from the scope of the present invention.

What is claimed is:

1. A picture information display device comprising:

a gas discharge display device of a self-scanned panel display type having a separate display function and scanning function, said discharge display device not being provided with an inherent memory;

an analog sample and hold circuit including a plurality of sample and hold units, each said unit having a memory capacitor and an MOS transistor gate driven by an *n*-bit shift register having n output terminals which are integrated on a semiconductor substrate for sampling and holding a picture information signal, which includes halftone of the picture, for each picture element;

a means for effecting luminance modulation of each line of said gas discharge display device by continuously controlling gas discharge current according to the picture information signal sampled by said analog sample and hold circuit corresponding to the respective picture element and stored in said memory capacitor for reproduction of said picture information signal; and a means for reproducing said picture information signal from serial to parallel format by sequentially displaying said line of the gas discharge display device in line at a time format by use of said analog sample and hold circuit.

2. A picture information display device as claimed in claim 1 wherein the MOS transistor gate includes a source electrode connected to a respective one of said *n* output terminals and a gate input terminal connected to a source of image signal, and the memory capacitor is connected to an output line of the gate transistor for supplying a control signal to the luminance modulation means.

3. A picture information display device as claimed in claim 2 wherein the luminance modulation means comprises a driving transistor having a control electrode supplied with said control signal and an output circuit including a photoluminance element of which luminance is controlled.

* * * * *